March 17, 1970   E. P. BRIGNAC   3,501,441
PROCESS FOR PREPARING A POLYAMIDE
Original Filed Aug. 24, 1962
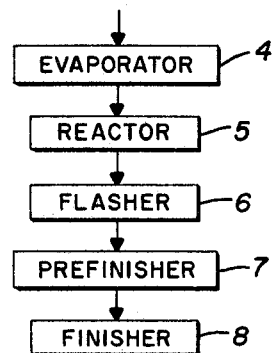
FIG.1.
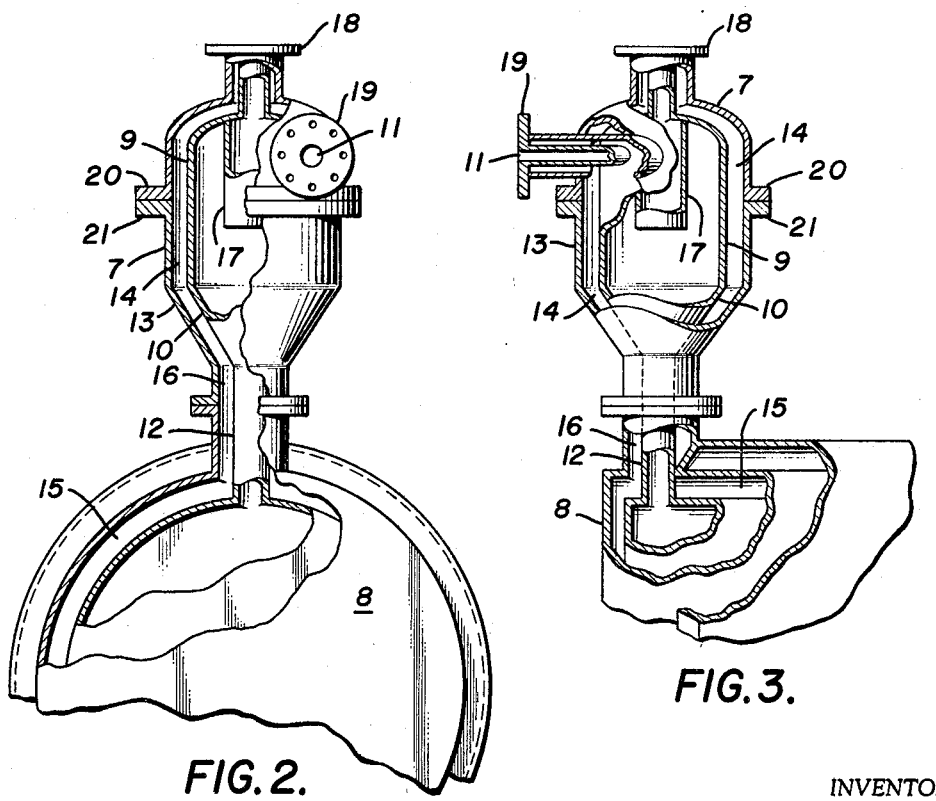
FIG.2.
FIG.3.
INVENTOR.
EDMOND P. BRIGNAC
BY George R. Beck
ATTORNEY

United States Patent Office 3,501,441
Patented Mar. 17, 1970

3,501,441
PROCESS FOR PREPARING A POLYAMIDE
Edmond P. Brignac, Pensacola, Fla., assignor to Monsanto Company, St. Louis, Mo., a corporation of Delaware
Application Aug. 24, 1962, Ser. No. 219,324, which is a continuation-in-part of application Ser. No. 426,574, Jan. 19, 1965. Divided and this application May 6, 1968, Ser. No. 726,773
Int. Cl. C08g 20/20
U.S. Cl. 260—78    5 Claims

ABSTRACT OF THE DISCLOSURE

In a process wherein an aqueous solution of polyamide-forming reactants is heated in a reaction zone to for a mixture of water and low molecular weight polyamide having a relative viscosity between about 4 and about 20, the pressure on the mixture is lowered in a flashing zone to vaporize a substantial proportion of the water in the mixture, and the polyamide is thereafter heated in a finishing zone to form a high molecular weight polyamide having a relative viscosity of at least about 40, the relative viscosity of the high molecular weight polyamide can be substantially increased by removing vaporized water from the mixture, prior to heating the polyamide in the finishing zone, by downwardly swirling the mixture from the flashing zone in a thin film against the inner surface of a vessel having a substantially vertical axis and a substantially circular horizontal cross-section so as to maintain an axial vapor space within said vessel, and sweeping the swirling mixture in said film with a gas inert to the polyamide by passing the inert gas through the axial vapor space within said vessel.

CROSS-REFERENCE TO RELATED APPLICATIONS

This application is a continuation-in-part of my copending application Ser. No. 426,574 which was filed on Jan. 19, 1965 as a division of my application Ser. No. 219,324 which was filed on Aug. 24, 1962 and is now abandoned. Application Ser. No. 426,574 is now also abandoned.

BACKGROUND OF THE INVENTION

It is known that various high molecular weight polyamides having recurring amide groups as an integral part of the main polymer chain can be formed into filaments in which the structural elements are oriented along the filament axis and which have many uses, e.g. in production of fibers for tire cords, textiles, etc. Examples of such filament-forming polyamides include nylon-66 (polyhexamethylene adipamide), nylon-68 (polyhexamethylene suberamide), nylon-610 (polyhexamethylene sebacamide), nylon-6 (poly-6-aminocaproic acid), etc. and copolymers thereof.

In the formation of such polyamides, a high molecular weight polymer is normally obtained by polycondensation of low molecular weight polymer that has been prepared from an aqueous solution of polyamide-forming reactants. The low molecular weight polymer is typically produced by a process in which a concentrated aqueous solution of the reactants is heated under pressure to a temperature sufficient to form low molecular weight polymer from the reactants. In general, the viscosity of the polymerizing mass increases substantially during production of the low molecular weight polymer and while the low molecular weight polymer is subsequently polycondensed to provide a higher molecular weight product having the desired degree of polymerization. The molecular weight or degree of polymerization of a high or low molecular weight polyamide is generally most conveniently measured in terms of its relative viscosity which, as used herein, is intended to mean the ratio of the absolute viscosity (in centipoises) at 25° C. of an 11 weight percent solution of the polyamide in a 90% solution of formic acid in water to the absolute viscosity (in centipoises) at 25° C. of the 90% formic acid solution alone. Also as used herein the term "low molecular weight polyamide" is intended to mean a polyamide having a relative viscosity (RV) of not more than about 20 and the term "high molecular weight polyamide" represents a polyamide having a higher relative viscosity than the low molecular weight polyamide from which it was prepared.

In general, the aqueous solution of polyamide-forming reactants includes at least one salt of an organic dicarboxylic acid which preferably contains from four to twelve carbon atoms, for example an alkylene or aromatic dicarboxylic acid such as adipic, succinic, suberic, sebacic, terephthalic or isophthalic acid, and an organic diamine which preferably contains from four to twelve carbon atoms, for example an alkylene or aromatic diamine such as hexamethylene, tetramethylene, pentamethylene, heptamethylene, decamethylene or meta- or para-phenylene diamine. In the preparation of fiber-forming polyamides, the diamine and dicarboxylic acid are generally combined in proportions that are approximately stoichiometrically equivalent and dissolved in water to form a solution containing from about 25% to about 55% and preferably from 40% to 50% by weight of the reactants. Further treatment of such solutions, for example, by pH adjustment, inclusion of additives or purification, e.g. by an absorbent such as activated carbon, may be carried out before polymerization, if desired, to improve the properties of the ultimate polymeric product.

Most desirably, the aqueous solution of polyamide-forming reactants is first heated to evaporate water and thereby concentrate the solution to at least about 60% by weight of the reactants, for example at a temperature between about 105° and about 165° C. and a pressure between about one atmosphere and about 100 pounds per square inch gauge. Depending on the specific temperatures employed in the evaporator, the reactants may undergo some initial polycondensation with production of short chain polymers of the acid and diamine. In such cases, the apparent concentration of free water in the solution (based on the weights of the concentrated solution and the reactants in the solution before polycondensation) may be less than that actually present and may in some cases approach zero. Thereafter, the concentrated solution is most conveniently heated to a temperature between about 200° and about 295° C. at a substantially higher pressure such as, for example, between about 150 and about 300 pounds per square inch gauge, to form a low molecular polyamide generally having an RV (under those conditions) between about 4 and about 20.

The water that is liberated by the amidation reaction of the diamine and the dicarboxylic acid and the remaining water of solution are normally dispersed in the low molecular weight polymer in the liquid phase. Removal of such water is conventionally facilitated by substantially lowering the pressure on the low molecular weight polymer (e.g. to between about 5 and about 50 p.s.i.a.) to vaporize and flash off a substantial proportion of the water in the polymer. However, the low molecular weight polyamide is generally sufficiently viscous that a considerable portion of the resulting water vapor normally remains entrained in the polymer and thereafter inhibits the subsequent polycondensation reaction and adversely affects the properties (e.g. the relative viscosity) of the high molecular weight polyamide product.

In accordance with prior art procedures, the entrained water vapor is removed from the polymer during the subsequent polycondensation reaction which is generally referred to as "finishing" and normally carried out by heating the low molecular weight polyamide between about 260° and about 300° C. and between about 5 and about 50 p.s.i.a. for about 0.1 to about 3 hours. However, the presence of the entrained water vapor requires that the initial portion of the finishing operation be devoted to driving off such water vapor, thereby diminishing the polycondensation effect of the finishing step. Although that difficulty can be overcome by extending the finishing period, that has the disadvantage of increasing the thermal degradation to which the polymer is typically subjected at the high temperatures used in finishing. Moreover, the entrained water vapor adversely affects heat transfer in the finisher and, in being driven off, normally causes violent splattering of the polymer onto the dome of the finishing vessel and thereby further restricts the transfer of heat to the polycondensing mass. Splattering of the polymer on the finisher dome also leads to the formation of obnoxious materials commonly known as "gel," which is objectionable in that it causes a substantial reduction in the quality of the final polymeric product and necessitates frequent shutdowns of the finisher for cleaning. Those problems could be overcome by substantially complete removal of water vapor from the low molecular weight polymer prior to finishing, but techniques previously used for that purpose (e.g. compression or passage of the polymer through an elongated tortuous path) have not been adequate to effect a satisfactorily complete removal. Accordingly, a process by which the entrained water vapor can be more completely removed from the low molecular weight polyamide prior to heating in the finisher is highly desirable, and it is an object of this invention to provide such a process.

SUMMARY OF THE INVENTION

It has now been discovered that in a process wherein an aqueous solution of polyamide-forming reactants is heated in a reaction zone to form a mixture of water and low molecular weight polyamide having a relative viscosity between about 4 and about 20, the pressure on the mixture is lowered in a flashing zone to vaporize a substantial proportion of the water in the mixture, and the polyamide is thereafter heated in a finishing zone to form a high molecular weight polyamide having a relative viscosity of at least about 40, the aforedescribed objective can be substantially achieved and the relative viscosity of the polyamide product can be substantially improved at a given polymer flow rate through the finishing zone or maintained at an increased polymer flow rate through the finishing zone by downwardly swirling the mixture from the flashing zone in a thin film against the inner surface of a vessel having a substantially vertical axis and a substantially circular horizontal cross-section so as to maintain an axial vapor space within said vessel, and sweeping the swirling mixture in said film with a gas inert to said polyamide by passing the inert gas through the axial vapor space within said vessel.

DESCRIPTION OF THE DRAWING AND PREFERRED EMBODIMENTS OF THE INVENTION

The invention will be more readily understood by reference to the following detailed description taken in conjunction with the accompanying drawing in which:

FIGURE 1 is a schematic flow diagram representing the preparation of a polyamide by a continuous system employing the improved process of this invention;

FIGURE 2 is a sectional elevation of a vessel in which the prefinishing step of the present invention can be carried out; and FIGURE 3 is a sectional side elevation of thet vessel shown in FIGURE 2.

Although the sysem and equipment shown in the drawing can be employed in polymerization of any of the aforementioned types of polyamide-forming reactants, it is particularly useful in preparing polymers of adipic acid and hexamethylene diamine, and it is with reference to those specific reactants that the invention will be described hereinafter.

Referring now to FIGURE 1, the system shown therein comprises an evaporator 4, a reactor 5, a flasher 6, a prefinisher 7, and a finisher 8. In operation, an aqueous solution of adipic acid and hexamethylene diamine is fed into evaporator 4. The aqueous solution generally contains between 25 and 55 weight percent of hexamethylene diammonium adipate and may also contain certain additives depending upon the desired product properties. A typical mixture of additives includes a copper compound such as cupric acetate, a halogen compound such as potassium iodide and, in some cases, an aryl sulfonamide that is inert to the polyamide. An antifoaming agent is also generally added to the salt solution.

Evaporator 4, which may be any conventional type of heat exchange apparatus, is usually operated at a pressure between atmospheric and 100 p.s.i.g. and at a temperature between 105° and 165° C. to evaporate enough water from the solution to raise its reactant concentration to at least about 60 weight percent and preferably to about 75 or more weight percent. Depending on the temperature, pressure and residence time (generally 10–30 minutes) in evaporator 4, oligomerization of the reactants may also begin there.

The concentrated solution from evaporator 4 is fed continuously into reactor 5 in which polymerization proceeds, generally at a temperature between about 200° and about 295° C. and preferably between 230° and 255° C., at a pressure between about 150 and about 300 p.s.i.g. and preferably between 230 and 270 p.s.i.g., and for about 0.5 to about 3 hours to provide a low molecular weight polyamide having an RV between about 4 and about 20. Reactor 5 may also be a conventional type of heat exchanger, e.g. of the shell-and-tube variety, and is advantageously equipped with means for agitation of the polymerizing mass and adapted for continuous withdrawal of vaporized water of solution and volatile polycondensation by-products such as water.

From reactor 5, the mixture of water and low molecular weight polymer may be continuously removed and transferred to a conventional pressure reduction unit or flasher 6 in which the pressure on the mixture is gradually lowered to between about 5 and about 50 p.s.i.a. at the flasher discharge and preferably to slightly more than one atmosphere. As a result of the pressure reduction, substantially all of the water in the mixture is vaporized. Flasher 6 is preferably adapted for continuous and rapid withdrawal of the water vapor from the mixture and for replacement of substantially all of the sensible heat that is utilized in vaporization of the water.

It should be understood that the aforedescribed evaporation, reaction and flashing steps and apparatus therefor are well known in the art and more fully described in the patent literature, e.g. in U.S. Patent Nos. 3,218,297 and 3,260,703, the disclosures of which are incorporated herein by reference. It should also be understood that the low molecular weight polymer leaving flasher 6 is generally characterized by an RV between 4 and 20, i.e. an RV that is not high enough for use of the polymer in production of high-tenacity filaments.

As it is discharged from flasher 6, the mixture of water vapor and low molecular weight polymer is extremely difficult to handle. The violent action of the flashing operation creates a foamy mixture in which the water is present in finely divided, uniformly dispersed bubbles. In addition, certain of the additives that are used to impart light stability, heat resistance and other desirable properties to the polymer normally add to the foaming problem. In fact, many desirable additives cause foaming problems so severe that their use has been impractical in conventional polymerization processes.

In accordance with the present invention, the foaming problem is substantially overcome by separating the bubbles of water vapor from the polymer in a prefinisher 7 which is a vessel having a substantially vertical axis and a substantially circular horizontal cross section that preferably decreases in diameter in a downward direction. The mixture of water vapor and low molecular weight polyamide from flasher 6 is fed to an upper portion of the prefinisher, preferably by directing a substantially horizontal stream of the mixture against the inner wall of the prefinisher and at such a rate that the mixture swirls gravitationally downward against the inner prefinisher wall in a thin film having an average thickness between about 0.125 and about 0.5 inch. The swirling mixture should enter the prefinisher with sufficient centrifugal force that it completes at least about 0.5 revolution therein before it is withdrawn from a lower portion thereof. While the mixture swirls downwardly with prefinisher 7, it is swept with a stream of inert gas (e.g. nitrogen, carbon dioxide or a mixture thereof) that is passed through the axial vapor space which is defined, within the prefinisher, by the thin film of swirling mixture. The combined effects of the centrifugal force on the swirling mixture and the inert gas sweep have been found to be surprisingly effective in removing the entrained water vapor from the mixture and thereby providing a low molecular weight polyamide that is advantageously prepared for efficient polycondensation in finisher 8.

For most effective use of the prefinisher, it should be adapted to heat the swirling mixture to between about 260° and 300° C., e.g. by the use of a fluid heat exchange medium circulated through a jacketed space surrounding the prefinisher wall. Pressure within the prefinisher should be approximately that of the flasher discharge, i.e., between about 5 and about 50 p.s.i.a. and preferably slightly above one atmosphere, and the inert gas (preferably preheated to 260°–300° C.) is preferably passed upwardly through the prefinisher at a rate between about 0.05 and about 2 standard cubic feet (s.c.f.) per pound of polymer flowing through the prefinisher in a like period of time. Use of the inert gas sweeps the bubbles of water vapor from the swirling polymer and carries them upwardly through the axial vapor space in the prefinisher to the uppermost portion thereof from which the inert gas and disengaged water vapor are withdrawn from the system.

From prefinisher 7, low molecular weight polyamide substantially stripped of water vapor is conducted into finisher 8 for polycondensation to a high molecular weight product. Finisher 8 can be any of a variety of conventional polymerization vessels, for example a horizontal screw finisher of the type described in U.S. Patent 3,218,297. Finisher 8 is preferably operated between about 260° and about 300° C. with the exact temperature determined according to the desired properties of the product being prepared, and at a pressure between about 5 and about 50 p.s.i.a. (preferably slightly above one atmosphere. It is also generally desirable to sweep the polymer in the finisher with an inert gas, e.g. nitrogen and/or carbon dioxide, and preferably in a direction countercurrent to the flow of polymer therein, to assist in removal of water liberated by the polycondensation reaction. After prefinishing in accordance with the present invention and a residence time from about 0.1 to about 3 hours in finisher 8, the polyamide withdrawn therefrom has an exceptionally high RV and is therefore highly suitable for spinning into filaments of great tensile strength.

In FIGURES 2 and 3 there is shown in sectional elevations an apparatus of preferred design for use as the prefinisher 7 in the system of FIGURE 1. As shown in FIGURES 2 and 3, prefinisher 7 is an upright hollow vessel comprising an upper cylindrical section 9 and a lower truncated conical 10 having its larger upper end contiguous to the lower end of cylindrical section 9. For use with polymerization units of standard size for commercial use, the cylindrical section 9 of prefinisher 7 will generally have an inside diameter between about 12 and about 27 inches and the inside diameter of the conical section 10 will downwardly decrease from the diameter of cylindrical section 9 at its uppermost portion to between about 4 and about 9 inches at its lowest portion. However, it should be understood that the prefinisher 7 need not have the configuration of that shown in FIGURES 2 and 3 but may be of any shape having a substantially circular cross-section that decreases continuously or otherwise from the level of polymer input to the level of polymer discharge. Thus, the prefinisher can be in the shape of a truncated cone without an upper cylindrical section or it may be of a shape having a curved inner wall, e.g. a truncated paraboloid.

In the embodiment shown in FIGURES 2 and 3, the foamy mixture of water vapor and low molecular weight polymer from flasher 6 enters prefinisher 7 horizontally through inlet 11 with sufficient linear velocity that it swirls around the peripheral inner surface of the prefinisher for at least one half revolution as its flows gravitationally downward in a thin film on the inner surfaces of sections 9 and 10 and before passing from the prefinisher into finisher 8 via conduit 12. Sections 9 and 10 of prefinisher 7 are enclosed within an outer shell 13 and separated therefrom by an annular space 14 through which there may be circulated a heating medium (e.g. steam or Dowtherm) suitable for maintaining the swirling polymer at the desired prefinishing temperature (generally 260–300° C.). Space 14 may be connected with a similar annular space 15 surrounding finisher 8 by an annular conduit 16 so that a single heating medium may be used to control the temperature of both the finisher 8 and the prefinisher 7.

As the foamy mixture from flasher 6 is swirled centrifugally against the inner surface of prefinished 7, the bubbles of water vapor forced therefrom rise upwardly through through the axial vapor space therein and are withdrawn from the upper portion thereof via vapor outlet 17. In accordance with the present invention, the swirling mixture is swept with an inert gas which preferably flows upwardly through the axial vapor space in prefinisher 7. The inert gas may be fed upwardlly through conduit 12 from an external source (not shown) or, as shown in the drawing, it may be inert gas previously employed in finisher 8 and fed into prefinisher 7 from the overhead vapor space of finisher 8 via conduit 12. After upward passage through the axial vapor space of prefinisher 7, the inert gas is withdrawn from the system through outlet 17 together with water vapor removed from the polymer undergoing prefinisher. Prefinisher 7 is constructed of two pieces joined by flanges 20 and 21 so that it may be opened for cleaning or inspection, if desired, and flanges 18 and 19 are provided for connection of prefinisher 7 to a vapor removal line and a low molecular weight polymer feed line, respectively.

The following examples are included to illustrate the use of the improved process of this invention for preparation of a polyamide and are not representative of any limitations on the scope of the invention.

EXAMPLE I

An aqueous solution containing about 75 weight percent of hexamethylene diammonium adipate was heated at about 235° C. and 250 p.s.i.g. for about 1.3 hours in a reaction zone as described hereinbefore to provide a mixture of water and low molecular weight polyhexamethylene adipamide having an RV of about 10. Thereafter, the pressure on the mixture was gradually lowered to about 14.85 p.s.i.a. in a flasher to vaporize a substantial proportion of the water in the mixture, also as described hereinbefore. After flashing, the mixture had a very foamy consistency indicating that it contained a high volumetric proportion of minute bubbles of water vapor. To remove the water vapor in accordance with the present invention, the mixture was horizontally fed at the rate of 1250 pounds per hour into a prefinisher of the type shown in FIGURES 2 and 3 and comprising an upper cylindrical section 9 having a diameter of 18 inches, a lower truncated conical section 10 having a lower diameter of 6 inches, and a height (from the top of section 9 to the bottom of section 10) of 28 inches. The mixture was thereby swirled in a thin film having an average thickness between 0.25 and 0.5 inch through approximately 1.5 revolutions in the prefinisher and swept with about 300 s.c.f. per hour of inert gas (80% nitrogen and 20% carbon dioxide) which was passed in a continuous upward stream through the axial vapor space within the prefinisher. Immediately thereafter, the prefinished polymer was fed through a horizontal screw finisher of a conventional type in which it was heated at 279° C. and 14.85 p.s.i.a. for about 0.75 hours during which it was swept with 300 s.c.f. per hour of the same type of inert gas. After the finishing step, the polymer had an average relative viscosity between 53 and 55. When the unit was shut down after 100 days of operation, there was no substantial accumulation of gel in the dome of the finisher.

COMPARATIVE EXAMPLE A

When the procedure of Example I was repeated with the exception that the prefinisher was omitted from the system and the foamy polymer from the flasher was fed directly into the finisher, the average RV of the finished polymer was between 49 and 50. After 100 days of operation, the overhead vapor space just under the dome of the finisher was substantially completely obstructed by accumulated gel.

EXAMPLE II

When the procedure of Example I was repeated with the exception that the flow rate of polymer through the system was 1600 pounds per hour, the average RV of the finished polymer was between 53 and 55.

COMPARATIVE EXAMPLE B

When the procedure of Example II was repeated with the exception that the prefinisher was omitted from the system and the foamy polymer from the flasher was fed directly into the finisher, the average RV of the finished polymer was between 44 and 46.

EXAMPLE III

When the procedure of Example I was repeated with the exception that the flow rate of polymer through the system was 2000 pounds per hour, the average RV of the finisher polymer was between 49 and 50.

COMPARATIVE EXAMPLE C

When the procedure of Example III was repeated with the exception that the prefinisher was omitted from the system and the foamy polymer from the flasher was fed directly into the finisher, the average RV of the finished polymer was 40.

Although the process of this invention has been described with preferred embodiments, many modifications and variations thereof may be employed without departing from the spirit and scope of the invention. Accordingly, it is to be understood that the invention is not limited to such specific embodiments except as it is defined in the appended claims.

I claim:

1. In a process wherein an aqueous solution of at least one salt of an organic diamine and an organic dicarboxylic acid is heated in a reaction zone to form a mixture of water and low molecular weight polyamide having a relative viscosity between about 4 and about 20, the pressure on the mixture is lowered in a flashing zone to vaporize a substantial proportion of the water in the mixture, and the polyamide is thereafter heated in a finishing zone to form a high molecular weight polyamide having a relative viscosity of at least about 40, said relative viscosity being defined as the ratio of the absolute viscosity of an 11 weight percent solution of the polyamide in a 90% solution of formic acid in water at 25° C. to the absolute viscosity of a 90% solution of formic acid in water at the same temperature, the improvement which comprises removing vaporized water from the mixture, prior to heating the polyamide in the finishing zone, by downwardly swirling the mixture from the flashing zone in a thin film against the inner surface of a vessel having a substantially vertical axis and a substantially circular horizontal cross-section so as to maintain an axial vapor space within said vessel, and sweeping the swirling mixture in said film with a gas inert to the polyamide by passing the inert gas through the axial vapor space within said vessel.

2. A process as defined in claim 1, in which said film has an average thickness between about 0.125 and about 0.5 inch.

3. A process as defined in claim 1, in which the mixture from the flashing zone is swirled against said inner surface for at least about 0.5 revolution within said vessel.

4. A process as defined in claim 1, in which the inert gas is passed upwardly through the axial vapor space at a rate between about 0.5 and about 2 standard cubic feet per pound of polyamide flowing through said vessel in a like period of time.

5. In a process wherein an aqueous solution containing at least about 60% by weight of hexamethylene diammonium adipate is heated in a reaction zone between about 200° and about 295° C. and between about 150 and about 300 p.s.i.g. for about 0.5 to about 3 hours to form a mixture of water and low molecular weight polyhexamethylene adipamide having a relative viscosity between about 4 and about 20, the pressure on the mixture is lowered in a flashing zone to between about 5 and about 50 p.s.i.a. to vaporize a substantial proportion of the water in the mixture, and the polyhexamethylene adipamide is thereafter heated in a finishing zone between about 260° and about 300° C. and between about 5 and about 50 p.s.i.a. for about 0.1 to about 3 hours to form a high molecular weight polyhexamethylene adipamide having a relative viscosity of at least about 40, said relative viscosity being defined as the ratio of the absolute viscosity of an 11 weight percent solution of the polyhexamethylene adipamide in a 90% solution of formic acid in water at 25° C. to the absolute viscosity of a 90% solution of formic acid in water at the same temperature, the improvement which comprises removing vaporized water from the mixture, prior to heating the polyhexamethylene adipamide in the finishing zone, by downwardly swirling the mixture from the flashing zone in a thin film against the inner surface of a vessel having a substantially vertical axis and a substantially circular horizontal cross-section so as to maintain an axial vapor space within said vessel, and sweeping the swirling mixture in said film with a gas inert to the polyamide by passing the inert gas upwardly through the axial vapor space within said vessel at a rate between about 0.5 and about 2 standard cubic feet per pound of polyhexamethylene adipamide flowing through said vessel in a like period of time.

References Cited

UNITED STATES PATENTS

| | | | |
|---|---|---|---|
| 2,735,839 | 2/1956 | Schrenk | 260—78 |
| 2,687,552 | 8/1954 | Gabler | 260—78 |
| 2,738,840 | 2/1956 | Lynch | 260—78 |
| 2,731,081 | 1/1956 | Mayner | 260—78 |
| 2,908,666 | 10/1959 | Notarbartolo | 260—78 |
| 2,923,699 | 2/1960 | Indest et al. | 260—78 |
| 3,027,355 | 3/1962 | Taul et al. | 260—78 |
| 3,113,843 | 12/1963 | Li | 23—285 |
| 3,218,297 | 11/1965 | Sovereign | 260—78 |
| 3,260,703 | 7/1966 | Coggeshall | 260—78 |

HAROLD D. ANDERSON, Primary Examiner

U.S. Cl. X.R.

260—95